UNITED STATES PATENT OFFICE.

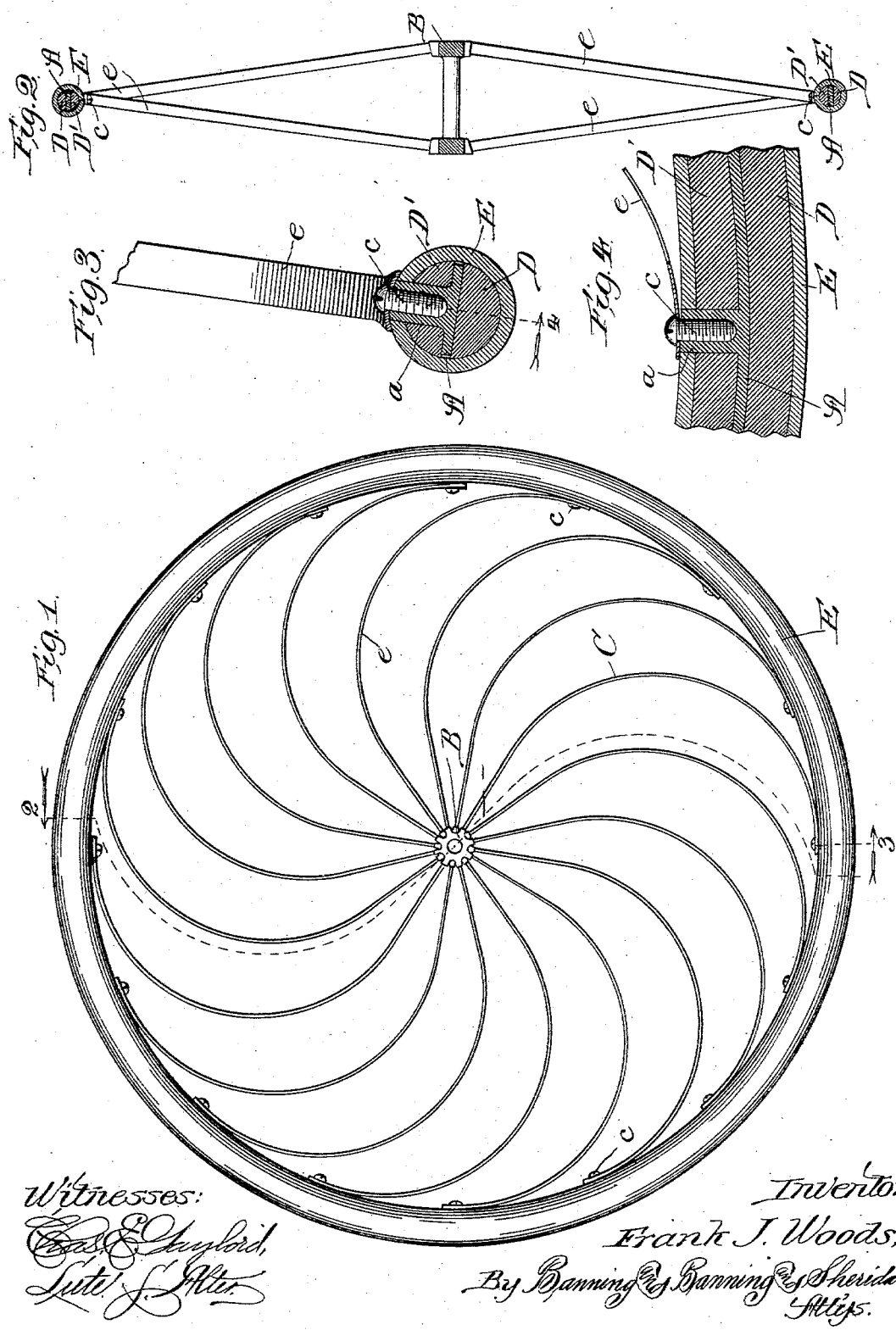

FRANK J. WOODS, OF CHICAGO, ILLINOIS.

VEHICLE-WHEEL.

SPECIFICATION forming part of Letters Patent No. 565,198, dated August 4, 1896.

Application filed February 4, 1896. Serial No. 577,995. (No model.)

*To all whom it may concern:*

Be it known that I, FRANK J. WOODS, a citizen of the United States, residing at Chicago, Cook county, Illinois, have invented certain new and useful Improvements in Vehicle Wheels and Tires, of which the following is a specification.

This invention relates particularly to wheels adapted for use on road-vehicles, and especially to that class of vehicles known as "safety-bicycles." It will be understood, however, that I intend to use my improvements in connection with all classes of vehicle constructions to which they may be adapted.

The object of my invention is to provide a simple, economical, and efficient vehicle-wheel, one adapted to absorb the shock incident to the usage of vehicle-wheels on rough roads, so that the rider or occupant of a vehicle-wheel will feel the shocks as little as possible, as well as prolonging the usefulness of the vehicle; and the invention consists in the features, combinations, and details of construction hereinafter described and claimed.

In the accompanying drawings, Figure 1 is a side elevation of a complete wheel with a tire secured thereto; Fig. 2, a vertical sectional elevation taken on line 2 of Fig. 1; Fig. 3, an enlarged transverse section of the felly and tire, taken on line 3 of Fig. 1; and Fig. 4 a detailed view of the portion of the rim and tire, partly in section, in an enlarged view.

In constructing my improvements I make a rim or felly A of the desired diameter and preferably of spring-steel and secure to it suitable nipples a.

I provide a hub portion B, which is secured to the nipples on the rims by means of the curved spokes C. These spokes are preferably made flexible and of metal, so as to permit of a slight cushioning of the shock between the rim and the hub.

To absorb a large amount of the shock incident to the usage of vehicle-wheels, I make a tire and secure it to the rim as follows: I use a semicylindrical annular ring D of cushioning material, preferably rubber, and secure it to the periphery of the rim A. I then take a second semicylindrical annular ring D' of cushioning material and secure it to the inner surface of the rim A. This second ring of cushioning material is perforated, so that the rim-nipples may be passed through for the securing of the spokes. I then take a sheath E, preferably formed of leather, and pass it around the entire tire, so as to form a protecting envelop for the same. I prefer to join this sheath at its inner circumference, as at e, either by sewing or cementing, though it is evident that the seam may be at any other part of the tire. After the tire and rim have been secured together the spokes may be secured to the nipples by means of the screws c, and thus complete the assembling of the different parts.

I claim—

1. In a vehicle-wheel, the combination of a rim portion, semicylindrical annular rings of cushioning material on the inner and outer surfaces of the rim, and an outer enveloping sheath of flexible material, substantially as described.

2. In a vehicle-wheel, the combination of an elastic rim portion, semicylindrical annular rings of cushioning material in the inner and outer surfaces of the rim, and an outer enveloping sheath of leather, substantially as described.

FRANK J. WOODS.

Witnesses:
 THOS. F. SHERIDAN,
 THOMAS B. McGREGOR.